United States Patent [19]
Ward et al.

[11] Patent Number: 6,046,676
[45] Date of Patent: Apr. 4, 2000

[54] SELF POWERED ELECTRONIC MEMORY IDENTIFICATION TAG WITH DUAL COMMUNICATION PORTS

[75] Inventors: James Peter Ward, Raleigh, N.C.; Kerry Maletsky, Monument, Colo.

[73] Assignee: International Business Machines Corporation, Armonk, N.Y.

[21] Appl. No.: 08/971,154

[22] Filed: Nov. 14, 1997

[51] Int. Cl.$^7$ .................................................. G08B 13/14
[52] U.S. Cl. .................................. 340/572.1; 340/572.2; 340/825.44; 455/557
[58] Field of Search ............................. 340/572.1, 572.7, 340/572.8, 825.54, 825.34, 572.2, 825.44; 711/141; 455/557, 556, 558, 552

[56] References Cited

U.S. PATENT DOCUMENTS

| | | | |
|---|---|---|---|
| 3,859,624 | 1/1975 | Kriofsky et al. | 340/572.1 |
| 4,857,893 | 8/1989 | Carroll | 340/572.1 |
| 5,055,835 | 10/1991 | Sutton | 340/825.54 |
| 5,099,227 | 3/1992 | Geiszler et al. | 340/572.1 |
| 5,337,044 | 8/1994 | Folger et al. | 340/825.44 |
| 5,343,319 | 8/1994 | Moore | 455/343 |
| 5,423,086 | 6/1995 | Cannon et al. | 455/186.1 |
| 5,446,447 | 8/1995 | Carney et al. | 340/572.1 |
| 5,495,234 | 2/1996 | Capp et al. | 340/825.21 |
| 5,497,140 | 3/1996 | Tuttle | 340/825.54 |
| 5,630,836 | 5/1997 | Prem et al. | 607/61 |
| 5,742,641 | 4/1998 | Dingsor | 455/557 |
| 5,774,062 | 6/1998 | Ikefuji | 340/825.54 |
| 5,802,578 | 9/1998 | Lovett | 711/147 |
| 5,884,190 | 3/1999 | Lintula et al. | 455/557 |

OTHER PUBLICATIONS

MicroStamp Marketplace (c) 1997, Micron Communications features John R. Tuttle.

Introducing the MicroStamp Engine (c) 1997 Micron Communications The schematic at pages 4 and 5 may be considered pertinent.

*Primary Examiner*—Nina Tong
*Attorney, Agent, or Firm*—George E. Grosser

[57] ABSTRACT

A tag for use in identifying and communicating with an electronic device such as a computer is disclosed. The tag is self powered from an RF interrogation signal when the electronic device is not operating. The tag is provided with DC power from the electronic device when it is communicating with the electronic device to which it is attached as a portion of memory of the electronic device.

6 Claims, 2 Drawing Sheets

SELF POWERED ELECTRONIC MEMORY IDENTIFICATION TAG WITH DUAL COMMUNICATION PORTS

FIELD OF THE INVENTION

This invention relates to the identification of items by electronic means and to electronic tags that may be affixed to items and read by a reader in the vicinity of the item using radio frequency signalling.

DESCRIPTION OF THE PRIOR ART

The use of radio frequency as an input to a computer is known and disclosed in U.S. Pat. No. 5,423,086 where a call pager has been connected to a lap top or other personal computer by means of the PCMCIA interface. This input of information to a computer by RF in addition to keyboard, public switched telephone network and other means such as scanners etc. does not provide for the interaction of a computer that is not in a power on state. It also does not allow information to be provided from the computer when it is not under power.

It is known in the art to construct a tag or chip or other package of information in electronic form which can be interrogated by a radio frequency signal to gather information about the item to which the tag is affixed. An example is disclosed in U.S. Pat. No. 5,497,140 issued to John R. Tuttle. These tags contain a memory, small battery and radio frequency transmitter/receiver. Sometimes they also contain a computer for implementing the discrimination logic needed to respond to interrogation without confusion and contention and for other purposes. Because they are fabricated on a single chip in large quantities they are now made very inexpensively.

They are intended to provide information to unconnected reader stations, and they rely on radio frequency modulated communication which is more complicated than direct connected communication. Also, these tags have their own battery and therefore have a limited shelf life.

Another family of tags are of the transponder type which rectify a radio frequency signal received from an interrogator unit in order to obtain power without a battery. The radio frequency signal may be a special power illumination signal or it may be the carrier of the interrogation signal. An example of this prior art is U.S. Pat. No. 4,857,893 issued to Gary T. Carroll.

All of these tags suffer from the disadvantage that they are only accessible by radio frequency signalling and are separate from the item to which they are attached. For those items which are electronic devices, there is a need for the electronic device to be able to inexpensively communicate with its tag when the electronic device is turned on. The tag must also be able to communicate with an interrogator while the electronic device is turned off.

SUMMARY OF THE INVENTION

These and other shortcomings of the prior art are overcome by the self powered dual port tag of the invention which has two modes of access to the on chip memory. In one mode of access, an electronic device such as a computer to which the tag is affixed can interrogate the tag by direct electrical connection and can supply power to the tag during such interrogation.

It is a further advantage of the invention that radio frequency signals used to communicate with the tag are rectified to provide DC power when the tag is being interrogated in radio frequency mode.

These and other advantages are obtained by this invention which incorporates a self powered wireless interface for communication with other stations while an electronic device to which it is affixed is turned off and power from the electronic device is unavailable. The tag also has a standard parallel or serial interface for communication between the non-volatile memory in the tag and an electronic device bus allowing normal access while the electronic device is running under power. In this way, information can be exchanged with the electronic device according to this invention, at anytime without having to apply power to the device or to leave it running 24 hours per day.

DESCRIPTION OF A PREFERRED EMBODIMENT

Figure 1:
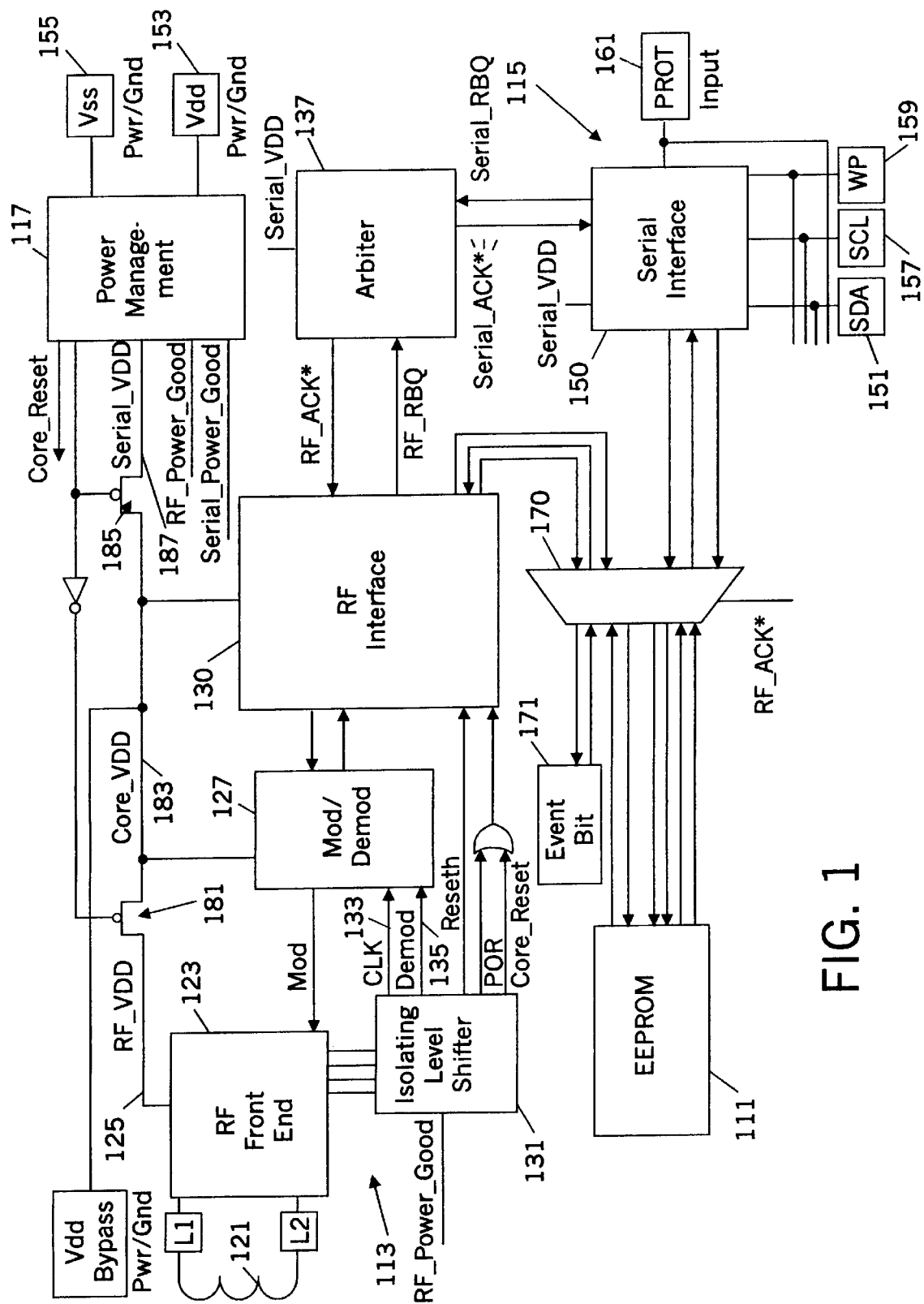
FIG. 1 shows a block diagram of a tag having a dual ports according to the invention.

As can be seen from a study of FIG. 1, a tag of the preferred embodiment of this invention functions as a dual access EEPROM. Both a wired serial port and wireless radio frequency identification (RFID) port are used to access the memory. Access permissions are set from the serial interface side to isolate blocks of memory from improper access depending on the situation. The RFID interface is designed to be powered solely from the attached coil, permitting remote reads and writes of the device by base station such as an RFID interrogator when the electronic device, to which the tag is attached, is turned off.

Figure 2:
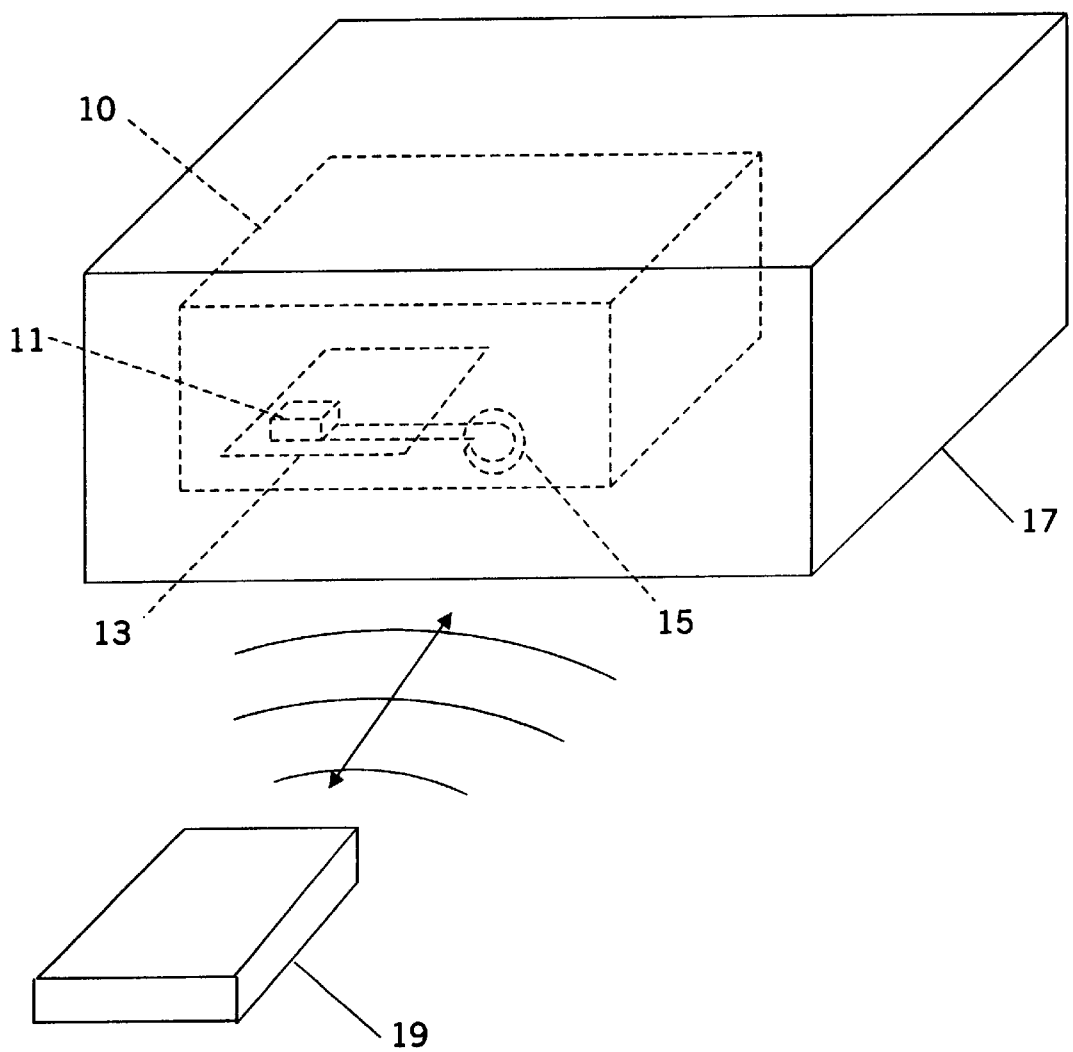
FIG. 2 shows a diagram of an electronic device in a shipping carton with the tag of the invention installed as memory on a circuit board in the device for interrogation by a reader writer.

The above described functions are better understood when FIG. 2 is considered in combination with the above description. In FIG. 2, a shipping carton 17 is shown having a computer 10 packed inside. Computer 10 has a circuit board carrying memory modules and other circuits in addition to the tag module 11 of this invention which is mounted on board 13 using a standard memory module package.

The tag of the preferred embodiment of the invention is made to be pin compatible with standard serial EEPROM devices except for pins 1, 2 & 3, which are address pins in the standard part. Connection of an external coil antenna 15 and an optional tuning capacitor (not shown), normally via a two conductor wire, is all that is required to complete the RFID tag hardware requirements. The tag is interrogated and the memory 11 read or written as shown at 21, whether power is on or off at the computer by an RFID interrogator 19. Interrogator 19 may be a self contained hand held unit that periodically is connected to another computer for data transfer or it may be mounted as part of a shipping area.

Referring again to FIG. 1, the heart of the tag of this invention is an electrically erasable programmable read only memory (EEPROM) 111. The tag has two communication ports in the form of an RF port shown at 113, and a serial port shown at 115. It will be recognized that a parallel port could be substituted for the serial port or both could be provided along with the RF port. Power to operate the memory 111 and the communication ports 113 and 115 is controlled by power management circuits 117 which will be described in greater detail below.

The RF port 113 comprises an antenna coil 121 connected to RF front end circuits 123. RF front end 123 comprises a rectifier for converting a portion of the RF energy into DC power which is provided on line 125. After power has been accumulated from the RF signals, is amplified and provided to the mod/demod circuits 127 for conversion into digital signals which can be detected and acted upon and/or stored into memory 111 by the logic in RF interface 130. Level shifter 131 provides the first steps in converting the RF signal to a digital signal by isolating the clock from the data and providing each on lines 133 and 135 respectively.

The serial port 115 is relatively simpler since the serial interface 150 can receive digital signals at input 151 without the need for conversion. DC power for operating the tag in the serial port mode is provided at connection 153 and ground is provided at 155 to power management 117. A serial clock signal is connected to input 157 and a write protect signal is connected to input 159. The write protect input protects the memory on a full chip basis. The input 161 is an access protect input that is used to protect memory on a page and block basis. Protect input 161 is connected to power on reset in the electronic device or computer and when this input pin is low, the serial port is held in reset and all sticky bits are set to one. When high, activity on the serial bus is permitted. This has the effect of resetting lock bits on access control bits so that only the set up process during power up is able to modify access and changes to security levels for memory pages or blocks can not be made from the RF port 113 or the serial port 115 after the system has been brought up.

An arbiter circuit 137 receives a serial request signal from the serial interface when the electronic device to which the tag is attached wishes to communicate with the tag. If the RF interface 130 is not communicating, the arbiter circuit 137 sends an ACK signal to the serial interface 150. In like manner, the arbiter circuit 137 receives an RF request signal from the RF interface when an interrogator wishes to communicate with the tag. If the serial interface 150 is not communicating, the arbiter circuit 137 sends an ACK signal to the RF interface 130.

Each of interfaces 130 and 150 is also connected to a gate 170 which is in turn connected to the memory 111 to allow one or the other interface to be connected to the memory 11 for reading or writing information.

Power to operate the memory 111 and the communication ports is controlled by power management circuits 117. When communicating with an interrogator, the power transistor 181 controlled by circuits 117 switches power from the line 125 to line 183 to power the memory 111, the mod/demod 127, the RF interface 130, arbiter 137 as well as the power management itself and the gate 170. When communicating with the electronic device to which the tag is attached, the power transistor 183 controlled by circuits 117 switches DC power received at power input 153 from the line 187 to line 183 to power the memory 111, the mod/demod 127, the RF interface 130, the serial interface 150, arbiter 137 as well as the power management itself and the gate 170.

The EEPROM memory 111 is broken up into 8 blocks of 1K bits (128 bytes) each. Within each block, the memory is physically organized into 8 pages of 128 bits (16 bytes) each. In some instances, accesses take place on a 32 bit (4 byte) word basis. In addition to these 8K bits, there are two more 128 bit pages that are used to store the access protection and ID information. There are a total of 8452 bits of EEPROM memory on the chip.

Access protection (both read and write) is organized on a block basis for blocks 1 through 7 and on a page and block basis for block 0. Protection information for these blocks and pages is stored in one of the additional pages of EEPROM memory that is addressed separately from the main data storage array. The ID value is located in the ID page of the EEPROM, the second of the additional 16 byte pages.

Writes from the serial port may include from one to 16 bytes at a time, depending on the protocol followed by the bus master. Accesses to the EEPROM from the RFID port are on either a word (32 bits) or page (128 bits) basis only. All page accesses must be properly aligned to the internal EEPROM page.

The EEPROM memory offers 100,000 write cycle endurance, with 10 year data retention. Writes from the serial port take less than 10 ms to complete, while writes from the RFID port are timed from the carrier and take 5 ms to complete.

All bits are sent to or read from the chip most significant bit first. Bit fields listed in this document are correspondingly listed with the MSB on the left and the LSB on the right.

Pin Name Description

| Pin | Name | Description |
|---|---|---|
| 1 | L1 | Coil Connection |
| 2 | L2 | Coil Connection |
| 3 | PROT | Protection Input |
| 4 | Vss | Ground |
| 5 | SDA | Serial Data, Open Drain I/O |
| 6 | SCL | Serial Clock Input |
| 7 | WP | Write Protect Input, No writes if high |
| 8 | Vdd | Supply: 2.4–5.5 V |

The third device address bit in the two wire protocol that is usually matched to $A_2$ (pin 3) on a standard serial EEPROM is internally connected high, so device addresses A8 through AF (hex) are used to access the memory on the chip.

The PROT pin is connected to power on reset and to BOIS control from the electronic device to which the tag is attached, so that only BIOS can control the security settings as specified during set up. When this pin is low, the serial port is held in reset and all sticky bits are set to one. When high, activity on the serial bus is permitted. All access protection bits are stored on a separate page of the EEPROM that is not accessed using the normal commands of a memory.

The RFID Access (RF) fields in the Access Protection Page determines whether or not the corresponding block within the memory can be read or written via the RFID interface. If an illegal command is attempted, the command will be aborted. The MSB, if clear, prohibits all accesses from the RFID port, and the LSB if clear prohibits writes from the RFID port. The fields are stored in the EEPROM and organized as follows:

| MSB | LSR | Meaning |
|---|---|---|
| 0 | 0 | No accesses permitted from RFID port |
| 0 | 1 | No accesses permitted from RFID port |
| 1 | 0 | Reads only from the RFID port |
| 1 | 1 | No restrictions for RFID accesses |

The Protection Bits (PB) fields in the Access Protection Page determine what type of accesses will be permitted via the serial port for each of the blocks on the chip. If an illegal access is attempted, the command will be NACK'ed. The MSB, if clear, prohibits all accesses to the block, and the LSB if clear prohibits writes. The fields are stored in the EEPROM and are organized as follows:

| MSB | LSB | Meaning |
| --- | --- | --- |
| 0 | 0 | No accesses permitted in the block |
| 0 | 1 | No accesses permitted in the block |
| 1 | 0 | Read only, writes cause a NACK |
| 1 | 1 | Read/write - No access constraints for data within this block |

Accessed within the Access Protection Page is an individual CMOS Sticky Bit (SB) for each of the 8 blocks on the chip. When the value of the sticky bit is 0, the Protection Bits (PB) for the corresponding block may not be changed via the software. These bits are all set to one when power is removed or when the PROT pin is low. These sticky bits may be written only to a zero via the serial interface using the standard serial write operations. Reading the sticky bits does not affect their state.

Because access permissions are set individually for each of the blocks, a sequential read via the serial port may only be used to read bytes within the block that was specified when the address was latched into the chip (with the write command). Any attempt to change the block number with the sequential access command will cause the read command to be NACK'ed. After the read of the last byte within the block, the internal serial address is reset to point at the beginning of that block, which is not the normal operation of standard serial EEPROMs.

In any event, if the WP pin is high, all writes commands are prohibited from the serial port. Accesses via the RFID port do not depend on the state of any pin or the state of any sticky bits, as power to the chip may not be applied when such accesses are taking place.

The operation of the block 0 write protection bits will now be described. The chip provides a mechanism to divide block 0 into eight 128 bit (16 byte) pages that can be individually protected against writes from either port. These eight write protection (WP) bits are stored within a byte of the access protection page, and are organized such that the LSB protects the first 128 bits and so on. If a bit in this byte is set to a one and the $PB_0$ field is set to 11, then writes are permitted on the page corresponding to the WP bit. If the WP bit is set to a zero or the $PB_0$ is any value other than 11, then writes are not permitted in that page. Within the remaining blocks on the chip, access permissions are controlled on a block basis (PB or RF bits) or full chip basis using the write protect (WP pin) only.

There is an additional EEPROM event latch that can be set from the RFID port and reset from the serial port of the chip. Resetting this bit from the serial port takes less than 10 ms. Setting of this bit from the RFID side takes about 5 ms, but requires less than 20 μA of current.

Access to this event bit from the serial interface is via the LSB of the event byte of the access protection page. The bit can only be set to zero via the serial port and attempts to write it to a value of one are ignored.

The serial port may be used by BIOS to read and write the Access Protection Page (APP) and the ID Page, using a device access code of 1011 (B hex) instead of the normal value of 1010 (A hex). The page address bits should be set to zero and the A2 bit in the device address field should be a 1. The least significant 4 bits of the byte address are then used to read and/or write the desired bytes in the two pages, while $A_4$ is used to select between the APP ($A_4$=0) and ID page ($A_4$=1). As an example, the bit encoding for a single byte write command is shown below.

$$1\ 0\ 1\ 1\ 1\ 0\ 0\ R/W\quad 0\ 0\ 0\ A_4\ A_3\ A_2\ A_1\ A_0\quad D_7\ D_6\ D_5\ D_4\ D_3\ D_2\ D_1\ D_0$$

Reads and writes to these two pages may take place on a single byte basis only. Operation of the chip is undefined if a multi byte access is attempted. With the exception of the 9 sticky bits (SB) and the two coil detect bits (DE & DC), all bits within the Access Protection Page are stored in EEPROM memory. Their state does not change if power is removed or when the PROT pin is held low.

The following page of memory (accessed with $A_4$=1) contains the ID field which may be transmitted by the chip from the RFID port. Bytes within it are accessed via a device address byte of B8/B9 (write/read, hex) and a byte address of 10 through 1F (hex). Reading and writing to this page is permitted only when the corresponding action is permissible on the upper section of the access protection page. The least significant three bits of the first byte should vary to optimize multiple tag performance. Other than setting the event bit via the RFID commands or reading the ID field when so directed, there is no way for the RFID port to directly read or write the access protection page or the ID page.

In general, the two wire serial interface on the chip functions in a usual but the following exceptions exist.
Pins 1, 2 & 3 have a different usage as described above.
1. Access to various blocks may be restricted via the access protection circuitry.
The three block address bits (sometimes referred to as page address bits) cannot be changed from their previous setting when a sequential read is performed.
They are set only via the write commands, and any attempt to change the upper two on a sequential read will be ignored.
Multi-byte accesses cannot cross block boundaries.
2. Operation of the serial bus at 400 KHz may conflict with RFID accesses.
Maximum operating voltage is 5.5 V, maximum operating temperature is 85° C.
The serial port will be reset whenever the PROT pin is low.
If a multi byte read is in progress when an RFID write starts, all data will be read as all 1's until the write completes, which will be within the next 5 ms.
Under some circumstances, subsequent bytes within a multibyte read may have their data returned as all 1's to the serial port if a read is simultaneously requested from the RFID port.

OPERATION OF THE INVENTION

The tag of the invention includes a powerful and flexible RFID communications port 113 that permits multiple tags to be resolved when they are within the field at the same time and permits explicit reads and writes to specified locations within the EEPROM. The method for implementing multiple tags within the field is as follows:

Upon power-up, the tag waits a random period of time and then transmits as a header a fixed pattern that occupies four bit times. The value of each half bit time is fixed at the pattern 01 11 11 10. This is interpreted as one half bit time with no modulation, 3 bit times of modulation and another half bit time of no modulation.

Within the following listening window, the tag must receive an acknowledge pulse from the reader.

If the tag does not see an acknowledge pulse during the specific time within the listening window, but sees an acknowledge pulse or command issued by the reader to another tag, it goes into an infinite listening window until the other tag is complete with its transaction.

If the tag does not see an acknowledge pulse or command from the reader at any time, it will wait for a random length of time before transmitting its four bit header again.

If it does receive this acknowledge pulse during the specific time, then it will continuously transmit its complete ID as described below with a three bit listening window between frames, until a command is received from the reader.

After the ID has been properly received by the reader, the tag will expect to receive a command from the reader during the three bit listening window between ID frames. One possible command is to set the QUIET bit, causing the chip to remain idle until the next power down or global command.

Remaining tags will then follow the same procedure until each has its QUIET bit set.

The method of operation of the invention in ID configuration is as follows. After the header field has been acknowledged, the tag will transmit as its ID number, the first 12 EEPROM bytes in the ID page, starting with byte 0. In the preferred embodiment, the ID number is an IEEE address as would be used on an ethernet to address the electronic device to which the tag is attached. This ID transmission will be preceded by a single start bit that has a logical value of 1. This start bit also precedes each page or block of data transmitted by the chip as a result of a read or write command.

After transmission of the ID frame, the chip will delay transmission during a 3 bit listening window to listen for a command to be initiated before repeating the ID transmission again. Commands must be initiated during specific time periods within this listening window. Commands sent at any other time are ignored unless they are global commands If a write is taking place to the EEPROM from one of the ports, the chip will output a logical zero on the other port in place of any and all EEPROM data until that write completes. If a write from one port has started before the command is issued on the other port, then the command will either not be acknowledged (if from the serial port) or the command sequence will be aborted and the 4 bit header sent (if from the RFID port).

Non EEPROM aspects of the RFID port operation, including setting of the event bit 171, will take place normally regardless of the actions on the serial port.

The operation during the listening window is as follows. After any header or data element is read from the chip for any reason, the chip delays further transmissions for a period of time to determine if the reader intends to communicate with the tag. The length of the various delays and the actions that the chip takes during this delay depends on the current state of the chip and/or any command issued by the reader.

There are four states possible for tags that are sufficiently in the field for the internal voltage to be above the reset level. They are:

Init Upon power up, and after execution of the global reset QUIET bit command, all chips are in this state. When the tag senses the next modulation pulse from the reader (at any time other than the first bit time after the chip transmits its header), the chip will move into either the Selected or Unselected state. Bits that do not have their QUIET bit set also go into this state after the execution of a 'Disable/Set Quiet' command. While in this state, chips delay a random length of time and then transmit their 4 bit header.

Selected If the reader issues an acknowledge pulse (a modulation interval of any length) during the second write bit time after the four bit time header is transmitted, then the tag is selected. The first and third bit times are ignored in order to prevent the tag from erroneously seeing its own modulation as incoming from the reader. The tag remains selected through the entire sequence of ID transmission and subsequent command execution unless there is a fault of some kind.

Unselected If a tag senses modulation of any sort during any bit time other than the second then it moves into the unselected state, and remains that way until it sees a 'Disable Chip' command. Unselected tags also honor the three global commands while they are 'waiting'. All other commands are ignored.

Quiet When in the quiet state, the chip does not cause its modulation resistor to be turned on at any time. Only the three global commands will be honored by the chip. All other commands are ignored.

The list below describes what sorts of delays are possible.

Random The chip delays a pseudo random length of time. The length of this delay is determined by taking the first three bits of byte 0 of the ID page within the EEPROM as a seed into a 3 bit pseudo random number generator, multiplying this by 8 plus 3 bit times. The chip waits this number of read bit times before issuing the 4 bit header again, for a total delay of 11 to 67 read bit times.

Three Bit The chip waits for three write bit times before retransmitting the data that was just transmitted. During the middle bit time, the reader may issue a command to the chip. There is no acknowledge or command initialization pulse, the first modulation interval is interpreted as the first bit of the command.

Long After certain commands, the chip waits indefinitely for the next command from the reader. This command can start during any bit time after the first write bit time of the interval.

Infinite The chip listens, without turning on its modulation resistor, for certain commands. If no modulation interval ever occurs, then the chip will stay in this delay loop for as long as power is applied.

Quiet Similar to 'infinite' except that fewer commands are honored.

If the reader issues an acknowledge pulse (a modulation interval of any length) during the second bit time of the random delay, the tag starts transmitting its ID frame to the reader one write bit time after the modulation ends, starting with the start bit.

The explicit RFID commands implemented in the preferred embodiment of the tag permit the reader/writer to directly access individual areas within the memory and are encoded as follows. The three bit commands are intended to speed large block reads and improve event latch operation. In all cases below, '$c_1 c_0$' represents a two bit error detection field for the 8 bit command.

For all commands, the first bit transmitted ($b_9/b_2$) is 0 in order to permit the transponder to be synchronized with the reader/writer. The second bit transmitted ($b_8/b_1$) signifies to the transponder the length of the command, either 3 bits (1) or 8 bits plus error detection (0).

| $B_9$ | $b_8$ | $b_7$ | $b_6$ | $b_5$ | $b_4$ | $b_3$ | $b_2$ | $b_1$ | $b_0$ | Meaning |
|---|---|---|---|---|---|---|---|---|---|---|
|  |  |  |  |  |  |  | 0 | 1 | 0 | Read sequential page (BL & PL) (128 bits of data) |
|  |  |  |  |  |  |  | 0 | 1 | 1 | Global set EEPROM Event Latch |
| 0 | 0 | $B_2$ | $B_1$ | $B_0$ | x | 0 | 0 | $c_1$ | $c_0$ | Set Block Address Latch (BL) to B |
| 0 | 0 | $P_2$ | $P_1$ | $P_0$ | 0 | 1 | 0 | $c_1$ | $c_0$ | Set Page Address Latch (PL) to P |
| 0 | 0 | $P_2$ | $P_1$ | $P_0$ | 1 | 0 | 1 | $c_1$ | $c_0$ | Write Page P in Block BL (followed by 128 bits of data) |
| 0 | 0 | $P_2$ | $P_1$ | $P_0$ | 0 | 0 | 1 | $c_1$ | $c_0$ | Read Page P in Block BL (followed by 128 bits of data) |
| 0 | 0 | $W_1$ | $W_0$ | 0 | 1 | 1 | 1 | $c_1$ | $c_0$ | Write Word W, Page PL, Block BL (32 bits of data) |
| 0 | 0 | $W_1$ | $W_0$ | 0 | 0 | 1 | 1 | $c_1$ | $C_0$ | Read Word W, Page PL, Block BL (32 bits of data) |
| 0 | 0 | 0 | 1 | 0 | 1 | 1 | 0 | $c_1$ | $c_0$ | Disable Chip Until Power Down (set QUIET bit) |
| 0 | 0 | 1 | 0 | 1 | 1 | 1 | 0 | $c_1$ | $c_0$ | Global Reset QUIET bit |
| 0 | 0 | 1 | 1 | 0 | 1 | 1 | 0 | $c_1$ | $c_0$ | Set EEPROM event latch (selected tag only) |
| 0 | 0 | $W_1$ | $W_0$ | 1 | 1 | 1 | 1 | $c_1$ | $c_0$ | Global Write Word W, Page 1, Block 0 (32 bits of data) |

The three global commands may be sent to selected chips during the second bit of the three bit listening window or to unselected or quiet chips at any time. In general, they operate upon all tags within the field, however if a chip is currently transmitting data to the reader it may not be able to recognize these commands, depending on the modulation and encoding options selected.

For the Read and Write commands, the data corresponding to the accessed word or page is repeatedly transmitted back to the reader by the chip after the command has completed. This permits a verify function for the write operation and a repetition check for the read data. Between each 32 or 128 bits of data transmitted, there is a 3 bit listening window to synchronize the reader and/or to permit the reader to issue a new command to the chip.

The proper command code including error detection bits plus the proper Manchester or other selected form of encoding data must be sent to the chip during the command interval. If either an illegal code or improper encoding is detected or if there is a protection failure, the command will be aborted and the chip will immediately resume its power-up header transmission sequence.

Both the BL and PL registers used in the read and write commands to determine the address are set to zero upon power-up. The PL value is automatically set to the transmitted value when the 'write page' and/or 'read page' commands are executed.

Having described the invention in terms of a preferred embodiment thereof, it will be recognized by those skilled in the art of computer equipment design that various additional changes in the structure and operation of the implementation described can be made without departing from the spirit and scope of the invention which is measured by the following claims.

We claim:

1. An integrated electronic memory tag comprising:

a first port for connection to a source of radio frequency signals;

a memory for digital signals;

a radio frequency power converter for converting a portion of the radio frequency energy received in the form of radio frequency signals into DC power for driving the memory;

a radio frequency signal converter for converting the radio frequency signal into a digital signal;

control logic in a radio frequency interface for responding to the digital signals passing between the memory and the first port;

a digital signal converter for converting a digital signal from the control logic into a radio frequency signal;

a second port for connection to an electronic device;

a contention arbiter for controlling which of the ports has access to the memory;

a logic gate, cooperating with the contention arbiter, for alternatively connecting the first port and the second port to the memory.

2. A digital memory system comprising:

a radio frequency identification tag for reading and writing a portion of memory of a computer even when the computer is powered off; the computer having the radio frequency identification tag connected as the portion of memory of the computer;

the radio frequency identification tag comprising a logic gate for alternatively connecting a memory bus of the computer and a radio frequency communication port of the tag to an electrically eraseable programmable read only memory in the tag which is the portion of memory;

an arbiter connected to the logic gate for resolving contention for access to the portion of memory when the computer is turned on.

3. A memory tag according to claim 1 wherein the digital signal converter is a modulator.

4. A memory tag according to claim 1 wherein the radio frequency signal converter is a demodulator.

5. A memory tag according to claim 1 wherein said second port is a computer serial port.

6. A digital memory system according to claim 2 wherein the portions of memory is an EEPROM device.

* * * * *